Patented Feb. 11, 1947

2,415,665

UNITED STATES PATENT OFFICE 2,415,665

REMOVAL OF NICKEL FROM COBALTIC HYDROXIDE PRECIPITATES CONTAINING THE SAME

Albert Edward Wallis and De Witt Henry West, Clydach, County of Glamorgan, Wales, assignors to The International Nickel Company, Inc., New York, N. Y., a corporation of Delaware No Drawing. Application January 19, 1943, Serial No. 472,874. In Great Britain November 28, 1941

12 Claims. (Cl. 23—183)

The present invention relates to purification of cobaltic hydroxide and more particularly to the purification of cobaltic hydroxide containing nickel.

In the treatment of most complex ores for the recovery of cobalt, cobalt is generally precipitated as the hydroxide. Two processes have most generally been used for the precipitation of cobalt as hydroxide. One process involves the use of hypochlorites of the alkali metals or alkaline earth metals to precipitate cobaltic hydroxide, while the other method involves the use of nickelic hydroxide to precipitate cobaltic hydroxide. The precipitate produced in either process always contains greater or lesser amounts of nickel. The amount of nickel contained in the precipitate is to some extent dependent upon the way in which the precipitate is produced and upon the ratio of nickel to cobalt in the liquors from which the cobalt precipitate is obtained. Quite often the amount of nickel in the cobalt precipitate when calculated on the metallic cobalt content of the precipitate may be as high as 50% or more. On the other hand, when the precipitation is carried out under carefully controlled conditions of pH, the cobaltic hydroxide precipitate may contain as little as 4% nickel calculated on the metallic cobalt content of the crude cobaltic hydroxide.

It is an object of the present invention to provide a means for reducing the nickel content of cobalt hydroxide containing nickel.

It is another object of the present invention to reduce the nickel content of cobalt hydroxide in cobalt hydroxide precipitates containing more than 1% nickel.

It is a further object of the present invention to provide a means for reducing the nickel content of cobalt hydroxide precipitates wherein the purification depends upon the cobalt-nickel ratio in the liquor.

According to the principles of the present invention, the process of the present invention involves digestion of the crude cobaltic hydroxide with solutions of cobalt salts. The said cobalt salts may be dissolved in an acid solution to form the digestion liquor or they may be extracted from the crude cobaltic hydroxide by treatment with acid. In either case the treatment of the crude cobaltic hydroxide may be carried out in a static or in a dynamic manner, that is to say, the crude cobaltic hydroxide may be digested with a solution of the cobalt salt until the equilibrium is established between the cobalt precipitate and the solution of cobalt salt, the precipitate separated from the liquor, and the partially purified cobaltic hydroxide treated a second or more times with fresh cobalt solution. After more than one treatment with a solution of cobalt salt, depending upon the amount of nickel present in the crude cobaltic hydroxide precipitate and the desired purity of the cobaltic hydroxide, the nickel content of the cobaltic hydroxide can be reduced to about 1%.

On the other hand, the impure cobaltic hydroxide precipitate may be treated with solutions of cobalt salts in a counter-current manner. That is to say, cobalt hydroxide precipitates with the highest nickel content are treated with cobalt solutions of the lowest cobalt content and highest nickel content; while the partially purified cobalt hydroxide containing the lowest amount of nickel is treated with solutions of cobalt salts having the highest cobalt content and lowest nickel content. This is readily understood when it is appreciated that the purification of cobaltic hydroxide relative to nickel with solutions of cobalt salts is dependent upon the interchange of the cobalt salt solution for the nickel of the cobaltic hydroxide precipitate. Accordingly, the crudest cobaltic hydroxide containing the largest amount of nickel is brought into contact with solutions containing the greater amounts of nickel, while cobaltic hydroxide precipitates containing the smallest amount of nickel are brought into contact with cobalt salt solutions which have the highest cobalt content, and the lowest nickel content. Thus, it will be apparent that the extent of nickel removal from the cobaltic hydroxide precipitate depends upon the existing nickel:cobalt ratios in the purification liquors. It will become apparent that as the nickel in the cobaltic hydroxide is replaced by the cobalt of the cobalt salt purifying solution, the cobalt of the cobalt salt solution is replaced by the nickel of the crude cobaltic hydroxide precipitate. In a countercurrent purification process, the fresh cobalt salt leaching solution is substantially devoid of, or only contains a minimum of nickel salts. This solution is brought into contact with a partially purified cobaltic hydroxide precipitate containing the least amount of insoluble nickel. As the nickel content of the cobalt salt leaching solution increases, the cobalt salt leaching solution is employed to treat cobalt hydroxide precipitates of greater and greater nickel content.

According to the present invention, the nickel in impure cobaltic hydroxide is largely removed both more economically and more conveniently than by existing methods by digesting the cobaltic hydroxide, i. e., heating it for a sufficient period of time in an acid liquor containing at least one cobalt salt, preferably the sulfate or chloride. During this process, the nickel in the crude cobaltic hydroxide is replaced by cobalt from the digestion liquor, that is to say, a base exchange occurs, and the nickel goes into solution.

The impure cobaltic hydroxide may simply be added to a digestion liquor, which preferably has a pH value from 1.5 to 2.0. However it is preferred to extract some or all of the cobalt salt in the liquor from the cobaltic hydroxide itself by treatment with an acid, and then under appropriate conditions the extraction and base-exchange reactions will proceed simultaneously. Reducing agents, for example sodium sulphite, may be added to facilitate the solution of the requisite quantity of cobalt. An acid solution having a low pH value, e. g., pH 1.0, is required, and if the two reactions are to proceed simultaneously the temperature must be relatively high, say 70° C. At low temperatures, e. g., 35° C., the acid will leach some cobalt from the hydroxide but the base-exchange will not occur until the temperature is raised. Thus the present invention includes the digestion of cobaltic hydroxide in an acid liquor having a pH value between 0.9 and 2.0, preferably at a temperature of at least 70° C. It is preferred to use sulphuric acid for this treatment, although other mineral acids may be employed. The extent to which the cobaltic hydroxide can be purified depends in part upon the final cobalt-nickel ratio in the liquor and the purification may, therefore, advantageously be carried out in stages by using liquors of progressively increasing cobalt content and progressively decreasing the nickel content. Where the digestion liquor contains added cobalt salts, the cobaltic hydroxide and liquor may advantageously flow in countercurrent through several digesting vessels. It is desirable to insure that the pH value of the digestion liquor is from 1.5 to 2.0 and if necessary, acid should be added to reduce it to this value. The digestion may be carried out at normal temperatures or at temperatures between 40° C. and 100° C., although higher temperatures may be employed. For example, crude cobaltic hydroxide containing 15% nickel may be digested with an aqueous solution containing 3 grams of cobalt per liter at a pH value of 2 and the nickel content reduced to 1%. In the event that the crude cobaltic hydroxide contains nickel in water soluble form, i. e. water-soluble nickel compounds, this water soluble nickel should be reduced to a minimum before the beginning of the purification according to the process set forth hereinbefore. In this connection, it will be understood that the percentages of nickel given herein refer to nickel insoluble in water, i. e., water-insoluble nickel compounds.

While a static process of purification of cobalt hydroxide may be employed and is preferred when the cobalt hydroxide is treated with acid to produce the cobalt salt solution for the base exchange operation to take place, where the digestion liquor consists of a solution of cobalt salts which have not been obtained from the cobalt hydroxide acid treatment some economy in the amount of added salts used can be effected by countercurrent purification, particularly when the amount of nickel present in the impure cobaltic hydroxide is relatively large. Thus, with a crude precipitate containing 8% nickel, about 10% of cobalt in the form of sulphate is required to effect the removal of nickel provided the operation is carried out countercurrently. On the other hand, if static purification were employed, then about 10 to about 20% of cobalt would be necessary to obtain the same degree of purification.

Illustrative of the results which may be obtained by the application of the principles of the present invention is the following:

A crude cobaltic hydroxide cake having a cobalt:nickel ratio of 15:1 may be digested at 70° C. for four hours in sulphuric acid of pH 1.0 and as a result of one such treatment the final product had a cobalt:nickel ratio of 70:1.

A cake containing a ratio of cobalt:nickel of 16:1 when treated with a cobalt salt solution having a cobalt:nickel ratio of 3:1 may be improved to provide a precipitate in which the cobalt:nickel ratio is 50:1. This partially purified cobaltic hydroxide precipitate having a cobalt:nickel ratio of 50:1 may then be digested with pure cobalt sulphate solutions and the purity of the cake improved from 50:1 to 140:1.

The process has been successfully operated with a crude cobaltic hydroxide cake containing a cobalt:nickel ratio of 4:1.

Generally it is preferred that the purifying liquors of the cobalt salt leaching solution shall contain about 1 to about 10 grams of cobalt per litre, preferably as the sulphate or chloride.

The amount of nickel which may be removed from a cobaltic hydroxide precipitate may be very small as is apparent from the fact that a cobalt hydroxide precipitate cake having a cobalt:nickel ratio of 70:1 can be improved to a cobalt:nickel ratio of 140:1 or even 160:1.

The raw material used in the present process may be any appropriate cobaltic hydroxide. It is preferred, however, to use the cobaltic hydroxide produced by the process for precipitating cobalt as a hydroxide as disclosed in applicants' copending application Serial No. 472,875, filed on January 19, 1943, now U. S. Patent No. 2,377,832, granted June 5, 1945.

Although the present invention has been described in conjunction with certain preferred embodiments thereof, those skilled in the art will readily understand that variations and modifications may be made. Such variations and modifications thereof are to be considered within the purview of the specification and the scope of the appended claims.

We claim:

1. A process for purifying cobaltic hydroxide precipitates containing nickel which comprises digesting cobaltic hydroxide precipitates containing nickel successively with cobalt salt solutions of increasing cobalt to nickel ratios, said cobalt salt solutions having a pH of approximately 1.5 to 2.0, so as to obtain a purified cobaltic hydroxide precipitate.

2. A process for removing nickel from cobaltic hydroxide precipitates containing water-soluble and water-insoluble nickel compounds to obtain a washed cobaltic hydroxide precipitate substantially devoid of water-soluble nickel compounds and containing water-insoluble nickel compounds which comprises digesting said washed cobaltic hydroxide precipitate successively with cobalt salt solutions of increasing cobalt to nickel ratios having a pH of approximately pH 1.5 to 2.0 so as to obtain a purified cobaltic hydroxide precipitate having a cobalt to nickel ratio of at least 70:1.

3. A process for removing nickel from cobaltic hydroxide precipitates containing water-insoluble nickel compounds and substantially devoid of water-soluble nickel compounds which comprises reacting the aforesaid cobaltic hydroxide precipitate successively with cobalt salt solutions of increasing cobalt to nickel ratios containing about 1 to 10 grams per liter of cobalt in the form of at least one cobalt salt and having a pH of approximately 1.5 to 2.0 so as to obtain a purified cobaltic hydroxide precipitate having a cobalt to nickel ratio of at least 70:1.

4. A process for purifying precipitates of cobaltic hydroxide containing nickel which comprises reacting a precipitate of cobaltic hydroxide containing nickel with a mineral acid solution containing a reducing agent and having a pH of approximately 1 and a temperature substantially lower than 70° C. so as to dissolve a portion only of said cobaltic hydroxide in said mineral acid solution in the form of a water-soluble cobalt salt of said mineral acid, and raising the temperature to at least about 70° C. while maintaining the pH within the range of approximately 1.5 to 2.0 so as to dissolve the nickel contained in said cobaltic hydroxide precipitate so that the nickel is replaced by the cobalt of said mineral acid solution and a purified cobaltic hydroxide precipitate is obtained.

5. A process for purifying precipitates of cobaltic hydroxide containing nickel which comprises reacting a precipitate of cobaltic hydroxide containing nickel with an aqueous solution containing sulfuric acid and a reducing agent and having a pH of approximately 1 at a temperature substantially lower than 70° C. to initiate dissolution of said cobaltic hydroxide with resultant formation of a water-soluble sulfate salt of cobalt, and raising the temperature to at least about 70° C. while maintaining the pH within the range of approximately 1.5 to 2.0 whereby the nickel contained in said cobaltic hydroxide precipitate goes into solution and is replaced by the cobalt of the treating liquor to obtain a purified cobalt precipitate in which the cobalt to nickel ratio is at least 70:1.

6. A process for purifying precipitates of cobaltic hydroxide containing nickel which comprises reacting a precipitate of cobaltic hydroxide containing nickel with a mineral acid solution having a pH of approximately 1 and a temperature of about 35° C. to dissolve a portion of said cobaltic hydroxide as a water-soluble cobalt salt of said mineral acid, and raising the temperature to at least about 70° C. while maintaining the pH within the range of approximately 1.5 to 2.0 so as to dissolve the nickel contained in said cobaltic hydroxide precipitate so that the nickel is replaced by the cobalt of said mineral acid solution and a purified cobaltic hydroxide precipitate having a cobalt to nickel ratio of at least 70:1 is obtained.

7. A process for purifying precipitates of cobaltic hydroxide containing nickel which comprises reacting a precipitate of cobaltic hydroxide containing nickel with a mineral acid solution having an initial pH of approximately 1.0 and a temperature substantially less than 70° C. to initiate dissolution of said cobaltic hydroxide precipitates with resultant formation of a water-soluble cobalt salt of said mineral acid, and raising the temperature to at least about 70° C. while maintaining a pH within the range of approximately 1.5 to 2.0 so as to dissolve the nickel contained in said cobaltic hydroxide precipitate so that the nickel is replaced by the cobalt of said mineral acid solution and a purified cobaltic hydroxide precipitate having a cobalt to nickel ratio of at least 70:1 is obtained.

8. A process for purifying precipitates of cobaltic hydroxide containing nickel which comprises reacting a cobaltic hydroxide precipitate containing nickel with a mineral acid solution having an initial pH of approximately 1.0 at a temperature of at least 70° C. to initiate dissolution of some of said cobaltic hydroxide precipitate with resultant formation of a water-soluble cobalt salt of said mineral acid and thereafter treating additional amounts of said cobaltic hydroxide precipitate in the resulting solution while maintaining the pH of said solution within the range of approximately 1.5 to 2.0 and maintaining a temperature of at least 70° C. so as to dissolve the nickel contained in said cobaltic hydroxide precipitate so that the nickel is replaced by the cobalt of said mineral acid solution and a purified cobaltic hydroxide precipitate having a cobalt to nickel ratio of at least 70:1 is obtained.

9. A process for purifying precipitates of cobaltic hydroxide containing nickel which comprises reacting a cobaltic hydroxide precipitate containing nickel with a mineral acid solution containing sodium sulfite and having an initial pH of approximately 1.0 at a temperature of at least about 70° C. to initiate dissolution of some of said cobaltic hydroxide precipitate with resultant formation of a water-soluble cobalt salt of said mineral acid and thereafter treating additional amounts of said cobaltic hydroxide precipitate in the resulting solution while maintaining the pH of said solution within the range of approximately 1.5 to 2.0 and maintaining a temperature of at least 70° C. so as to dissolve the nickel contained in said cobaltic hydroxide precipitate so that the nickel is replaced by the cobalt of said mineral acid solution and a purified cobaltic hydroxide precipitate having a cobalt to nickel ratio of at least 70:1 is obtained.

10. A process for purifying precipitates of cobaltic hydroxide containing nickel which comprises reacting a precipitate of cobaltic hydroxide containing nickel with an aqueous solution containing sulfuric acid and sodium sulfite and having an initial pH of approximately 1.0 and a temperature of at least about 70° C. to initiate dissolution of some of said cobaltic hydroxide precipitate with the resultant formation of a water-soluble sulfate salt of cobalt and thereafter treating additional amounts of said cobaltic hydroxide precipitate in the resulting solution while maintaining the pH of said solution within the range of approximately 1.5 to 2.0 and maintaining a temperature of at least about 70° C. so as to obtain a purified cobaltic hydroxide precipitate having a cobalt to nickel ratio of at least about 70:1.

11. A process for purifying precipitates of cobaltic hydroxide containing nickel which comprises digesting a precipitate of cobaltic hydroxide containing nickel with an aqueous solution of sulfuric acid having a pH of approximately 1.5 to 2.0 and containing about 1 to about 10 grams per liter of a water-soluble sulfate salt of cobalt while maintaining a temperature of at least about 70° C. so as to obtain a purified cobaltic hydroxide precipitate having a cobalt to nickel ratio of at least about 70:1.

12. A process for purifying precipitates of cobaltic hydroxide containing nickel which comprises digesting a precipitate of cobaltic hydroxide containing nickel with an aqueous mineral acid solution having a pH of approximately 1.5 to 2.0 and containing about 1 to about 10 grams per liter of a water-soluble cobalt salt of said mineral acid while maintaining a temperature of at least about 70° C. so as obtain a purified cobaltic hydroxide precipitate having a cobalt to nickel ratio of at least about 70:1.

A. E. WALLIS.
DE W. H. WEST.

REFERENCES CITED

The following references are of record in the file of this patent:

UNITED STATES PATENTS

| Number | Name | Date |
|---|---|---|
| 2,349,223 | Hedley et al. | May 16, 1944 |
| 2,232,527 | Hill | Feb. 18, 1941 |
| 821,637 | Handy | May 29, 1906 |
| 466,495 | Herrenschmidt | Jan. 5, 1892 |